UNITED STATES PATENT OFFICE.

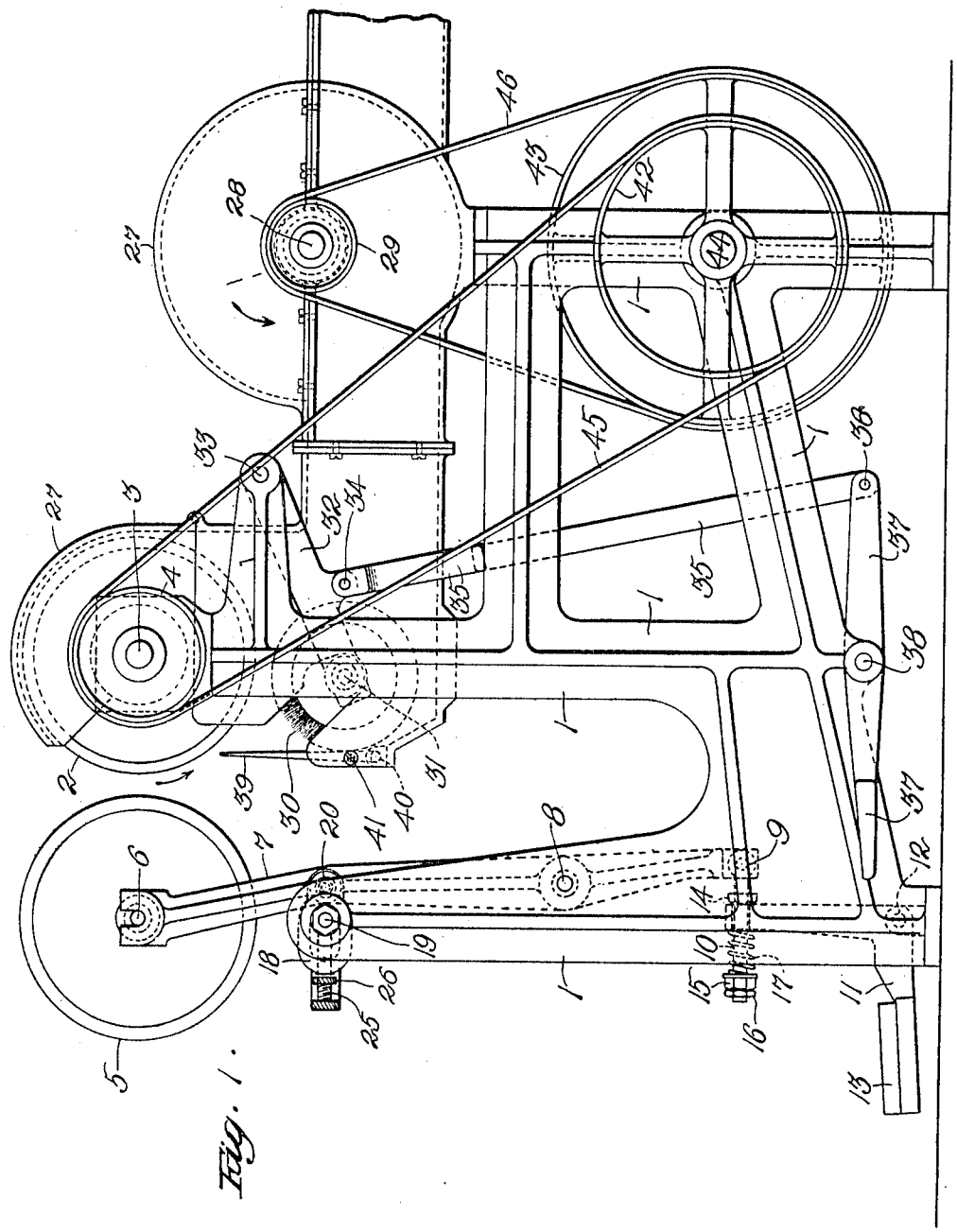

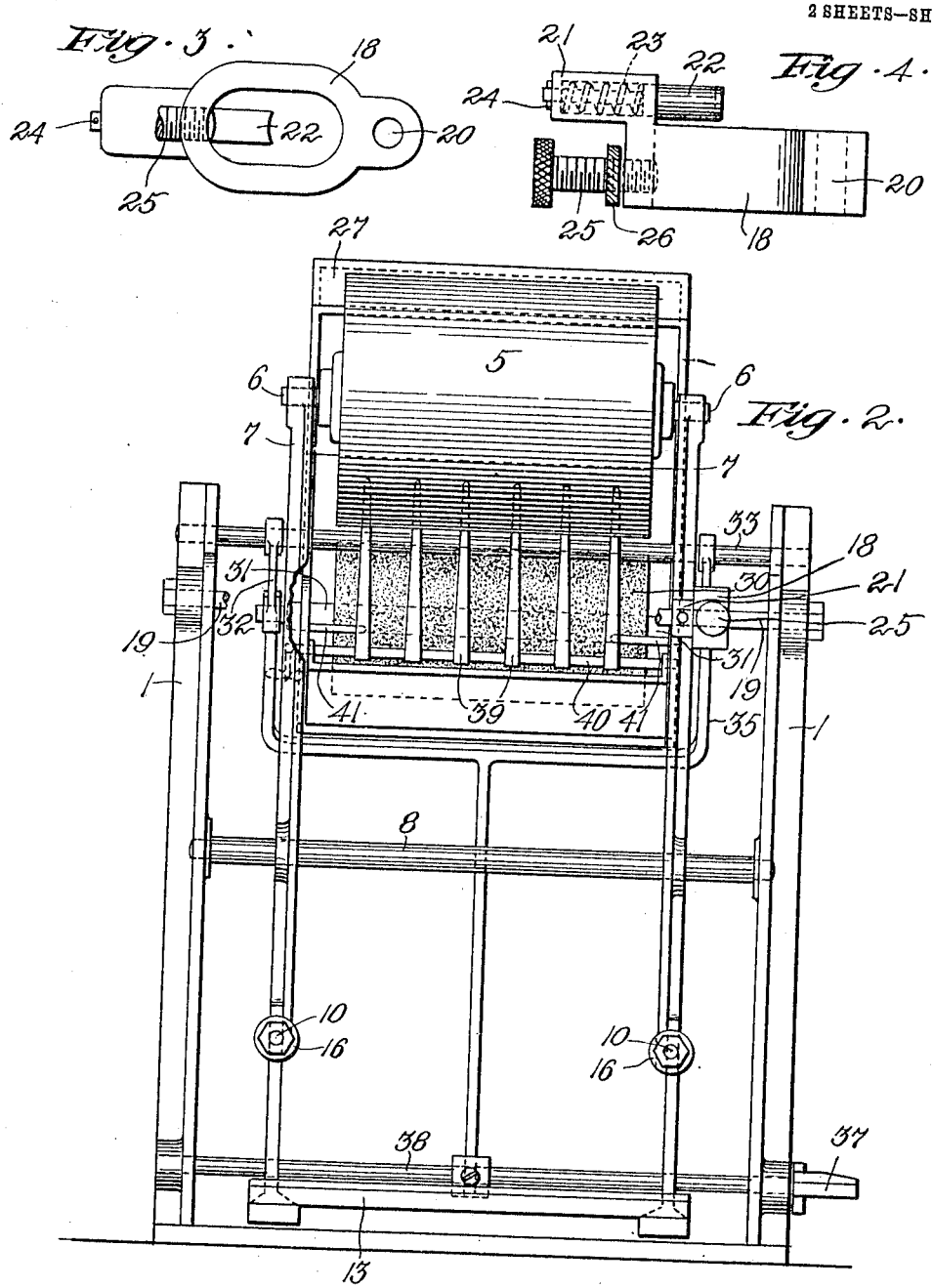

EUGENE A. FISHER AND JOSEPH W. STEINHAUSER, OF BETHEL, VERMONT.

HIDE AND OTHER MATERIAL WORKING MACHINE.

950,618.  Specification of Letters Patent.  Patented Mar. 1, 1910.

Application filed June 19, 1908. Serial No. 439,395.

*To all whom it may concern:*

Be it known that we, EUGENE A. FISHER, a subject of the German Emperor, and JOSEPH W. STEINHAUSER, a citizen of the United States, both residents of Bethel, in the county of Windsor and State of Vermont, have invented certain new and useful Improvements in Hide and other Material Working Machines, of which the following is a specification.

Our invention relates to machines in which a rotary roll is employed to work upon material for the purpose of cleansing, cutting, grinding, polishing or otherwise treating the same, for example buffing leather, and its object is to provide means for cleansing said work roll without stopping its rotation, also means for protecting such material from the draft caused by fans so often employed in these machines to carry off the matter removed from the material.

It is illustrated by the accompanying drawings in which—

Figure 1 is a side elevation of the machine. Fig. 2 is a front elevation with the pulleys omitted. Figs. 3 and 4 are detail views of certain portions of the machine.

Similar characters refer to similar parts throughout the several drawings.

The parts are mounted upon the frame 1. The work roll 2 is mounted upon the shaft 3 journaled in the frame, to the end of which shaft is fixed the pulley 4. The bed (feed) roll 5 is mounted upon the shaft 6 journaled in the swinging arms 7 mounted upon the shaft 8 fixed to the frame and having their lower ends pivoted at 9 to longitudinally adjustable rods 10 slidingly mounted in the upper ends of the bell crank levers 11 fulcrumed on the shaft 12 fixed to the frame and supporting on their lower ends the treadle 13. These adjustable sliding rods 10 are furnished on their inner ends with adjustable nuts 14 which engage the upper inner ends of the bell crank levers and are furnished on their outer ends with spring adjusting nuts 15 and lock nuts 16. The springs 17 are adjustably mounted upon these rods between the nuts 15 and the upper outer ends of the bell crank levers. The frames 18 are oscillatively and slidingly mounted upon the shaft 19 fixed to the frame and are pivoted at 20 to the swinging arms 7 and they include chambers 21 through which run the plunger rods 22, whose enlarged inner ends are adapted to contact with the frame 1 and on whose reduced outer portions are disposed the springs 23. The outer ends of these springs abut against the walls of the chamber and the inner ends abut against the enlarged portion of the plunger rods. The pins 24 hold the frames on the plungers. The inward movement of the frames is limited by the adjustable set screws 25, which are held in adjustment by the nuts 26. The hood 27 is mounted upon the frame 1 and within this hood is arranged a fan (not shown) upon the fan shaft 28 journaled in the frame, to the end of which shaft is fixed the pulley 29. Within the hood 27 is also arranged the rotary brush 30 whose shaft 31 is mounted in the free ends of the swinging arms 32 pivoted to the frame at 33 and pivoted at 34 to the forked link 35, which, in turn, is pivoted at 36 to the treadle 37 fulcrumed on the shaft 38 fixed to the frame. The gate 39 is fixed to the shaft 40 rotatably mounted in the frame and is locked in a vertical position by the pins 41 extending through the frame and into the gate. The object of the hood and fan is to provide for the disposal by suction or draft of the waste material, and the object of the gate is to prevent the material worked upon from being drawn into the hood. The gate is hinged to provide easy access to the interior of the hood and more particularly to the brush mounted therein. The pulleys 42 and 43 are fixed on the main driving shaft 44 and are connected by belts 45 and 46 respectively with the work roll shaft and the fan shaft.

The operation is as follows: Power being applied, the work roll and the fan roll rotate in the direction shown by the arrows, the bed (feed) roll and the brush roll being at rest as shown in Fig. 1. The operator places the material to be treated over the bed roll and depresses the treadle 13 thereby bringing the bed roll into contact with the work roll, he having first secured the desired pressure, for example five pounds or ten pounds, between the bed roll and work roll by adjusting the springs 17 upon the sliding rods 10. At the same time the springs 23 are compressed in the chambers 21 (Fig. 4) and, when the operator removes his foot from said treadle, these springs return the bed roll to its normal position. The operator, whenever he desires to clean the work roll, depresses the treadle 37, thereby bringing the brush 30 into contact with said work roll, the brush being returned by gravity, when the operator's foot is removed from the treadle. The material, as it is operated upon, drops down in front of the gate 39 and is prevented thereby from being drawn into the hood.

The features of our invention are as follows: First—Means for cleaning the work roll without stopping the machine. Second—Protecting the material operated on from being drawn into the hood by the draft created by the fan. Third—Providing easy access to the hood and brush disposed therein. Fourth—Adjusting the pressure between the bed (feed) roll and work roll. Fifth—Counterbalancing the bed (feed) roll.

In the operations mentioned, and similar operations, it is customary to cover the work roll with material adapted to perform the desired work—for example, for buffing leather the work roll is covered with emery paper or cloth. Heretofore, in order to clean these coverings it has been necessary to stop the machine and remove them from the work roll, which results in the loss of much time and in the speedy destruction of such coverings. We avoid these difficulties by the means described, which provide for a speedy and economical cleaning of the work roll or its covering as frequently as may be desired, without stopping the machine.

Having described our invention what we claim and desire to secure by Letters Patent is:

1. In a machine of the character described, a frame; a work roll mounted thereon; a work-supporting roll mounted on said frame and movable to and away from said work roll; and a brush roll for periodically cleaning said work roll and movable to and away from it; with means for accomplishing said movements; substantially as described.

2. In a machine of the character described, a frame; a work roll mounted thereon; a work-supporting roll mounted on said frame; and a brush roll for periodically cleaning said work roll and movable to and away from it; with means for accomplishing said movements; substantially as described.

3. In a machine of the character described, a frame; a work roll mounted thereon; a work-supporting roll mounted on said frame and movable to and away from said work roll; and a brush roll for periodically cleaning said work roll and movable to and away from it; with treadle mechanism for accomplishing said movements; substantially as described.

4. In a machine of the character described, a frame; a work roll mounted thereon; a work-supporting roll mounted on said frame; and a brush roll for periodically cleaning said work roll and movable to and away from it; with treadle mechanism for accomplishing said movements; substantially as described.

5. In a machine of the character described, a frame and mounted thereon; a work roll; a hood; and a gate mounted in front of said hood; with means for opening and closing said gate and means for holding the same in a closed position; substantially as described.

6. In a machine of the character described, a frame and mounted thereon; a work roll; a hood; a brush roll mounted therein; and a gate mounted in front of said hood; with means for opening and closing said gate and means for holding the same in a closed position; substantially as described.

7. In a machine of the character described, a frame; a work roll mounted thereon; and a bed roll mounted in swinging arms journaled in said frame and movable to and away from said work roll; with means for moving said bed roll to said work roll; and means for moving said bed roll away from said work roll; said last-named means comprising spring-controlled frames oscillatively and slidingly mounted in said first-named frame and pivoted to said swinging arms; with controlling springs; substantially as described.

8. In a machine of the character described, a frame; a work roll mounted thereon; and a bed roll mounted in swinging arms journaled in said frame and movable to and away from said work roll; with means for moving said bed roll to said work roll; and means for moving said bed roll away from said work roll; said last-named means comprising spring-controlled frames oscillatively and slidingly mounted on said first-named frame and pivoted to said swinging arms; with controlling springs; and with adjustable means for limiting the inward movement of said frame; substantially as described.

In testimony whereof we have affixed our signatures, in presence of two witnesses.

EUGENE A. FISHER.
JOSEPH W. STEINHAUSER.

Witnesses:
M. A. MOODY,
WALLACE BATCHELDER.